United States Patent
Yamamoto

(10) Patent No.: US 7,152,723 B2
(45) Date of Patent: Dec. 26, 2006

(54) PARKING DEVICE FOR MOTOR VEHICLE

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 165 days.

(21) Appl. No.: 10/519,160

(22) PCT Filed: Apr. 19, 2004

(86) PCT No.: PCT/JP2004/005553

§ 371 (c)(1),
(2), (4) Date: Dec. 23, 2004

(87) PCT Pub. No.: WO2004/097267

PCT Pub. Date: Nov. 11, 2004

(65) Prior Publication Data

US 2005/0236251 A1 Oct. 27, 2005

(30) Foreign Application Priority Data

Apr. 25, 2003 (JP) ............................. 2003-121241

(51) Int. Cl.
*F16H 63/34* (2006.01)
*B60T 1/06* (2006.01)

(52) U.S. Cl. ..................... 192/219.4; 74/335; 74/411.5

(58) Field of Classification Search ............. 192/219.4, 192/219.5
See application file for complete search history.

(56) References Cited

U.S. PATENT DOCUMENTS 4,987,792 A * 1/1991 Mueller et al. .......... 74/473.12

FOREIGN PATENT DOCUMENTS

EP 1251301 A2 * 10/2002

* cited by examiner

*Primary Examiner*—Richard M. Lorence

(57) ABSTRACT

A parking device for vehicles in which the rotation of an input shaft of a transmission is not limited by the frictional force of an engine when the engine is brought into a halt, the parking device comprising a parking gear provided on the input shaft, a parking lock mechanism which selectively engages with the parking gear, a change lever mechanically coupled to the parking lock mechanism, a speed-change actuator for shifting the transmission to each gear, a parking operation detection device arranged in an operation passage of the change lever from the neutral position to a parking position, and a control device. When the operation of the change lever has been confirmed by the parking operation detection device at the time when the change lever is operated from the neutral position to the parking position, the control device operates the speed-change actuator to bring the transmission into engagement with a predetermined gear.

2 Claims, 2 Drawing Sheets

PARKING DEVICE FOR MOTOR VEHICLE

TECHNICAL FIELD

The present invention relates to a parking device for vehicles in which a clutch is disconnected when an engine is brought into a halt and hence, the rotation of an input shaft of a transmission cannot be limited by the frictional force of the engine.

BACKGROUND ART

In a vehicle mounting an automatic transmission that is a fluid transmission, the vehicle has a structure that the hydraulic pressure is produced by a hydraulic pump driven by an engine, and a multiple-disc clutch is engaged by the hydraulic pressure to secure a gear position. When the engine is brought into a halt, therefore, no hydraulic pressure can be produced and, consequently, the transmission is automatically shifted to the neutral state at the time of shutdown of the engine. Therefore, the vehicle mounting the automatic transmission that is a fluid transmission is not capable of limiting the rotation of the wheels by utilizing the frictional force of the engine. Therefore, the vehicle mounting the automatic transmission that is a fluid transmission has a parking gear provided on the output shaft of the transmission and is equipped with a parking lock mechanism, which selectively engages with the above parking gear, so that the parking lock mechanism is engaged with the parking gear at the time of parking. When the parking gear provided on the output shaft of the transmission is locked, however, a maximum output torque of the transmission acts on the parking lock mechanism creating a condition which is very disadvantageous from the standpoint of strength. In the medium- to heavy-sized trucks mounting the automatic transmissions, therefore, the parking lock mechanism is not established from the standpoint of strength, and the parking lock mechanism cannot be furnished to such type of trucks.

In the vehicles using a parallel shaft gear type transmission and using a hydraulic multiple-disc clutch or an electromagnetic powder clutch, too, the clutch is disconnected when the engine is brought into a halt and hence, the rotation of the wheels cannot be limited by using the frictional force of the engine. In the vehicles of this type, too, therefore, it can be contrived to provide the output shaft of the transmission with a parking gear and to lock the parking gear at the time of parking. In the medium- to heavy-duty trucks, however, the parking lock mechanism is not established from the standpoint of strength as described above. To solve this problem, JP-A 2000-264178 discloses a parking device for a vehicle having a parking gear provided on the input shaft of the transmission so that the parking gear is locked at the time of parking.

However, in the parking device for vehicles in which the input shaft of the transmission is provided with a parking gear that is locked at the time of parking, which is described in the above publication, the transmission must be brought into engagement with a predetermined gear prior to locking the parking gear. In the device in which the parking lock mechanism is mechanically coupled to a change lever, however, the parking lock mechanism is caused to work if the change lever is operated to the parking position at the time of parking. As a result, the input shaft is locked and hence, it makes impossible to bring the transmission into engagement with a predetermined gear. Even when the change lever is moved to the parking position at the time of parking, therefore, the transmission remains in the neutral state arousing a problem in that the parking lock function does not work.

DISCLOSURE OF THE INVENTION

It is an object of the present invention to provide a parking device for vehicles, which, when a change lever is operated to the parking position at the time of parking, is so designed as to bring the transmission into engagement with a predetermined gear.

In order to achieve the above object, according to the present invention, it is to provide a parking device for vehicles in which the rotation of an input shaft of a transmission can not be limited by the frictional force of an engine when the engine is brought into a halt, the parking device comprising:

a parking gear provided on the input shaft, a parking lock mechanism which selectively engages with the parking gear, a change lever which instructs a gear position of the transmission and is mechanically coupled to the parking lock mechanism, and a speed-change actuator for shifting the transmission to each gear position;

and further comprising:

a neutral position detection means arranged at a neutral position of the change lever, a parking operation detection means arranged in an operation passage of the change lever from the neutral position to a parking position, and a control means for operating the speed-change actuator based on detection signals from the neutral position detection means and the parking operation detection means;

wherein, after the neutral position of the change lever has been confirmed based on the detection signal from the neutral position detection means, when the operation of the change lever is confirmed based on the detection signal from the parking operation detection means, the control means operates the speed-change actuator to bring the transmission into engagement with a predetermined gear position.

Provision is further made of a limiting means for limiting the engagement of the parking lock mechanism with the parking gear, and the control means operates the limiting means until the transmission is brought into engagement with a predetermined gear position when the operation of the change lever has been confirmed based on the detection signal from the parking operation detection means.

BEST MODE FOR CARRYING OUT THE INVENTION

A preferred embodiment of a parking device for vehicles constituted according to the present invention will now be described in further detail with reference to the accompanying drawings.

Figure 1:
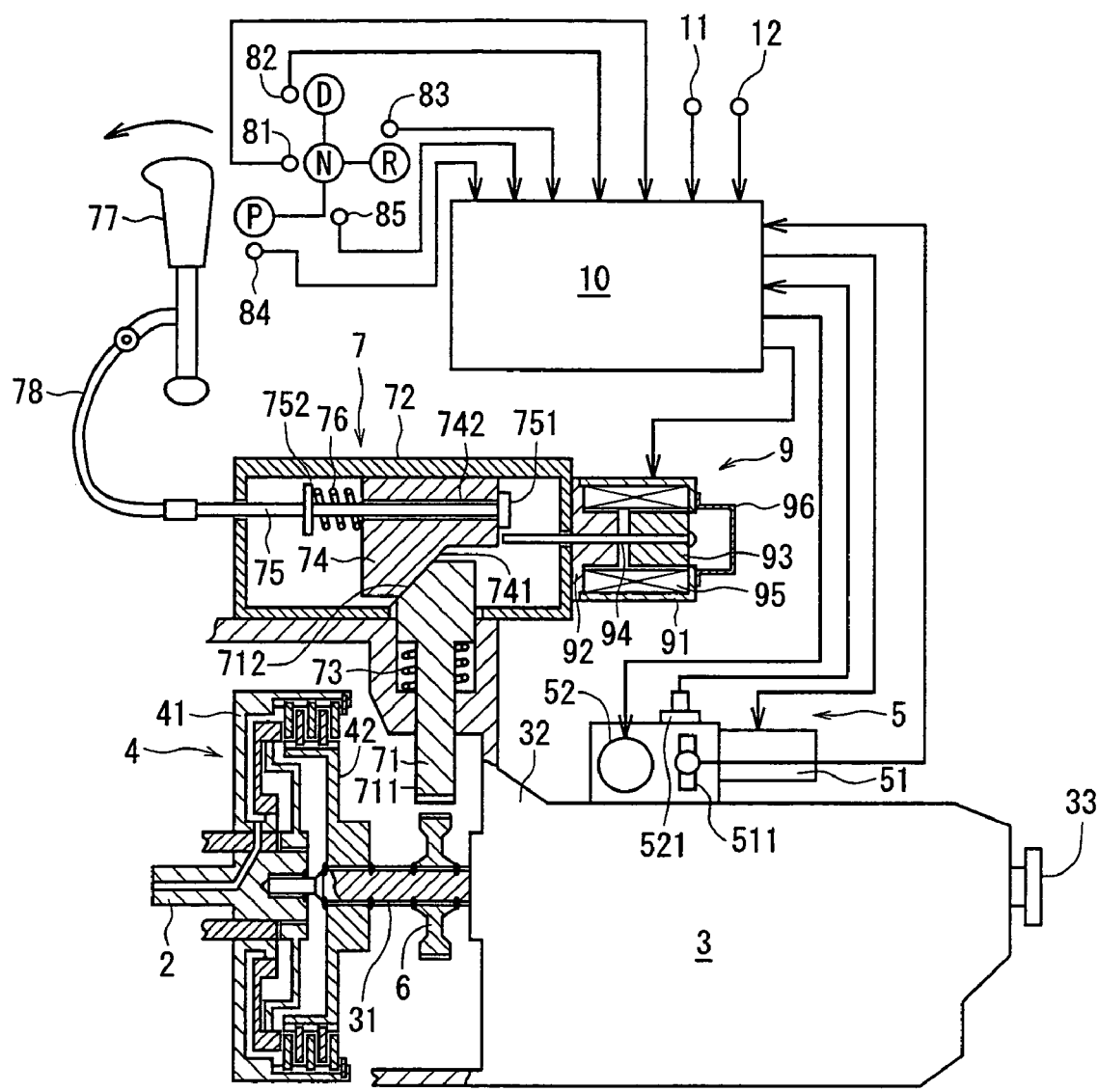
FIG. 1 is a view schematically illustrating the constitution of a parking device for vehicles, constituted according to the present invention.

FIG. 1 is a view schematically illustrating the constitution of a parking device for vehicles constituted according to the present invention. A drive shaft 2 driven by an engine (not shown) such as an internal combustion engine or the like and an input shaft 31 of a transmission 3 are arranged on the same axis. A hydraulic multiple-disc clutch 4 is arranged between the drive shaft 2 and the input shaft 31. The hydraulic multiple-disc clutch 4 may be constituted by a clutch outer 41 mounted on the drive shaft 2 and a clutch inner 42 mounted on the input shaft 31 in a customary manner. The transmission 3 is a known parallel shaft gear type transmission, which is to be brought into engagement with each gear position by a speed-change actuator 5. The speed-change actuator 5 may be a known one comprising a select actuator 51 and a shift actuator 52 which are constituted, for example, by electric motors, and is actuated by a speed-change instruction signal sent from a control means that will be described later. The select actuator 51 and the shift actuator 52 are, respectively, provided with a selected position detection sensor 511 and a shifted position detection sensor 521 for detecting their respective operated positions. These sensors send detection signals to a control means that will be described later.

A parking gear 6 is mounted on the input shaft 31 of the transmission 3. The parking gear 6 selectively engages with a parking lock mechanism 7. The parking lock mechanism 7 has an engaging member 71 that is arranged facing the outer periphery of the parking gear 6 and is supported by a casing 32 of the transmission 3 so as to slide up and down in the drawing. The engaging member 71 has, at a lower end thereof, teeth 711 in the drawing to engage with the parking gear 6, and has, at an upper end thereof, an inclined to-be-operated surface 712. The inclined to-be-operated surface 712 is inserted in a housing 72 arranged on the upper side of the casing 32. The thus formed engaging member 71 is urged upward in the drawing due to a coil spring 73 arranged relative to the casing 32. An operation member 74 is arranged in the housing 72 to be allowed to slide in the right-and-left direction in the drawing to operate the engaging member 71. The operation member 74 has an inclined operation surface 741 that engages with the inclined to-be-operated surface 712 of the engaging member 74, and has a through-hole 742 penetrating through in the right-and-left direction in the drawing. An operation rod 75 is slidably inserted in the through-hole 742 of the thus formed operation member 74. A stopper 751 is mounted on the right end of the operation rod 75 in the drawing. Further, a spring receiver 752 is provided on the operation rod 75 on the left side of the operation member 74 in the drawing. A coil spring 76 is arranged between the spring receiver 752 and the operation member 74. A push-pull cable 78 operated by a change lever 77 is coupled to the left end of the operation rod 75 in the drawing. Therefore, when the change lever 77 is moved in a direction indicated by an arrow in the drawing, the operation rod 75 moves toward the right in the drawing via the push-pull cable 78 and hence, the operation member 74 moves toward the right in the drawing via the coil spring 76. When the operation member 74 moves toward the right in the drawing, the engaging member 71 moves downward in the drawing against the spring force of the coil spring 73 due to the engaging action between the inclined operation surface 741 of the operation member 74 and the inclined to-be-operated surface 712 of the engaging member 71, whereby the teeth 711 formed at the lower end thereof is brought into engagement with the parking gear 6.

In the illustrated embodiment, the above change lever 77 is so constituted to be operated to the neutral position (N), drive position (D), reverse position (R) and parking position (P) depending upon the operation pattern that is illustrated. Detection means are each provided at the respective operation positions of the change lever 77. Namely, a neutral position detection means 81 is provided at the neutral position (N), a drive position detection means 82 is provided at the drive position (D), a reverse position detection means 83 is provided at the reverse position (R), and a parking position detection means 84 is provided at the parking position (P). In the illustrated embodiment, the operation passage from the neutral position (N) to the parking position (P), i.e., the passage between the neutral position (N) and the parking position (P) is formed in a hooked shape, and a parking operation detection means 85 is provided at the hooked portion. These detection means send their detection signals to the control means that will be described later.

Further, in the illustrated embodiment, the parking lock mechanism 7 is provided with an electromagnetic solenoid 9 which serves as a parking lock limiting means for temporarily limiting the movement of the operation member 74 that constitutes the parking lock mechanism 7 even in a state where the change lever 77 has been operated to the parking position (P). The electromagnetic solenoid 9 comprises a cylindrical casing 91, a fixed yoke 92 that is made of a magnetic material and is mounted on an end on the side of the housing 72, of the casing 91, a moving yoke 93 that comes in contact with, and separates away from, the fixed yoke 92, a push rod 94 that is made of a nonmagnetic material and is mounted, at its one end, on the moving yoke 93, an electromagnetic coil 95 arranged surrounding the fixed yoke 92 and the moving yoke 93, and a cover member 96 that is mounted on the other end of the casing 91 and covers the moving yoke 93. In the thus constituted electromagnetic solenoid 9, an end of the push rod 94 penetrates through the housing 72 and faces the right end surface of the operation member 74 in the drawing. When the electromagnetic coil 95 is energized in the thus constituted electromagnetic solenoid 9, the moving yoke 93 is attracted by the fixed yoke 92, and the push rod 94 mounted on the moving yoke 93 moves toward the left in the drawing to limit the operation member 74 from moving toward the right in the drawing.

The parking device of the illustrated embodiment has a control means 10. The control means is constituted by a microcomputer, and has a central processing unit (CPU) for executing an arithmetic processing according to a control program, a read-only memory (ROM) for storing the control program and the like, a random-access memory (RAM) for storing the operated results and the like, a timer, and the like. The control means 10 receives detection signals from the neutral position detection means 81, drive position detection means 82, reverse position detection means 83, parking position detection means 84, parking operation detection means 85, a selected position detection sensor 511, a shifted position detection sensor 521, a vehicle speed sensor 11 for detecting the traveling speed of the vehicle and an accelerator sensor 12 for detecting the amount of an accelerator pedal (not shown) depressed. The control means 10 sends control signals to the select actuator 51 and the shift actuator 52 that constitute the speed-change actuator 5, and to the electromagnetic solenoid 9, and the like.

The parking device of the illustrated embodiment is constituted as described above, and described below is the operation thereof.

When the change lever 77 is operated to the neutral position (N), the control means 10 sends a control signal to the select actuator 51 and the shift actuator 52 constituting the speed-change actuator 5 based on a detection signal from the neutral position detection means 81 to place the transmission 3 in the neutral state. When the change lever 77 is positioned to the drive position (D), the control means 10 executes an automatic speed-change control based on a detection signal from the drive position detection means 82. That is, the control means 10 determines a target gear based on the detection signals from the vehicle speed sensor 11 and the accelerator sensor 12, and sends control signals to the select actuator 51 and to the shift actuator 52 so that the gear is brought into engagement with the target gear that has been determined. Next, when the change lever 77 is moved to the reverse position (R), the control means 10 sends control signals to the select actuator 51 and to the shift actuator 52 based on a detection signal from the reverse position detection means 83 so that the transmission 3 is brought into engagement with the reverse gear.

Next, described blow is a case when the vehicle comes to a halt and parks.

When the vehicle is to be brought into a halt, the change lever 77 has been positioned to the neutral position (N). Here, since when the parking device is to be operated, the engine has been halted, the hydraulic multiple-disc clutch 4 that is operated by the hydraulic pressure produced by a hydraulic pump that is operated by driving force of the engine is in a state where the transmission of power is shut off, because the engine is not running. Then, when the change lever 77 is operated toward the parking position (P) to operate the parking device, the parking operation detection means 85 is turned-on on the way to the parking position (P), and a turn-on signal thereof is sent to the control means 10. In response to the turn-on signal from the parking operation detection means 85, the control means 10 sends control signals to the select actuator 51 and to the shift actuator 52 constituting the speed-change actuator 5 to bring the transmission 3 into engagement with a predetermined gear (e.g., first speed gear or second speed gear gear). Therefore, the transmission 3 is placed in a state where it is engaged with a predetermined gear (e.g., first speed gear or second speed gear). On this occasion, as described above, the hydraulic multiple-disc clutch 4 is in a state where the transmission of power is shut off; i.e., the input shaft 31 of the transmission 3 is allowed to rotate and the gears can be smoothly engaged. Then, when the change lever 77 is further moved toward the parking position (P) as indicated by an arrow and reaches the parking position (P), the operation rod 75 is moved toward the right in the drawing via the push-pull cable 78. As a result, the operation member 74 is moved toward the right in the drawing via the coil spring 76. Due to the engaging action of the inclined operation surface 741 of the operation member 74 and the inclined to-be-operated surface 712 of the engaging member 71, therefore, the engaging member 71 moves downward in the drawing against the spring force of the coil spring 73, and the teeth 711 formed at the lower end of the engaging member 71 are brought into engagement with the parking gear 6. Thereby, the teeth 711 of the engaging member 71 are engaged with the parking gear 6 and consequently, the input shaft 31 of the transmission 3 is locked and is limited from rotating. Thus, the transmission 3 is brought into engagement with a predetermined gear (e.g., first speed gear or second speed gear) and the input shaft 31 of the transmission 3 becomes in a locked state, whereby the rotation of the wheels (not shown) drivingly coupled to the output shaft 33 of the transmission is limited and the parking state is established.

In the illustrated embodiment, when at the time of operating the change lever 77 to the parking position (P), the parking operation detection means 85 provided at the hooked portion is turned-on on the way to the parking position (P), the control means 10 sends a control signal to energize the electromagnetic coil 95 of the electromagnetic solenoid 9 there by to operate the electromagnetic solenoid 9. As a result, the operation member 74 is limited from moving toward the right in the drawing, as described above. When the change lever 77 arrives at the parking position (P) in this state, the operation rod 75 compresses the coil spring 76 and is operated toward the right in the drawing via the push-pull cable 78. While the operation member 74 is thus limited from moving toward the right in the drawing, the transmission 3 is reliably brought into engagement with the predetermined gear (e.g., first speed gear or second speed gear) by the operation of the select actuator 51 and the shift actuator 52, which constitute the speed-change actuator 5. And, when the engagement operation of the transmission 3 with the predetermined gear (e.g., first speed gear or second speed gear) by the select actuator 51 and the shift actuator 52 is completed, the control means 10 de-energizes the electromagnetic coil 95 of the electromagnetic solenoid 9. As a result, the operation member 74 is liberated from being limited, and moves toward the right in the drawing by the force of the coil spring 76 that has been compressed. Thereby, due to the engaging action of the inclined operation surface 741 of the operation member 74 and the inclined to-be-operated surface 712 of the engaging member 71, the engaging member 71 moves downward in the drawing against the spring force of the coil spring 73 and the teeth 711 formed at the lower end of the engaging member 71 are brought into engagement with the parking gear 6. Thus, by operating the electromagnetic solenoid 9 to temporarily limit the movement of the operation member 74 until the transmission 3 is brought into engagement with a predetermined gear (e.g., first speed gear or second speed gear), the input shaft 31 of the transmission 3 can be locked after the transmission 3 has been brought into engagement with the predetermined gear (e.g., first speed gear or second speed gear) even when the change lever 77 is quickly operated to the parking position (P). Whether the transmission 3 has been brought into engagement with the predetermined gear (e.g., first speed gear or second speed gear) is judged based on detection signals from the selected position detection sensor 511 and the shifted position detection sensor 521.

Figure 2:
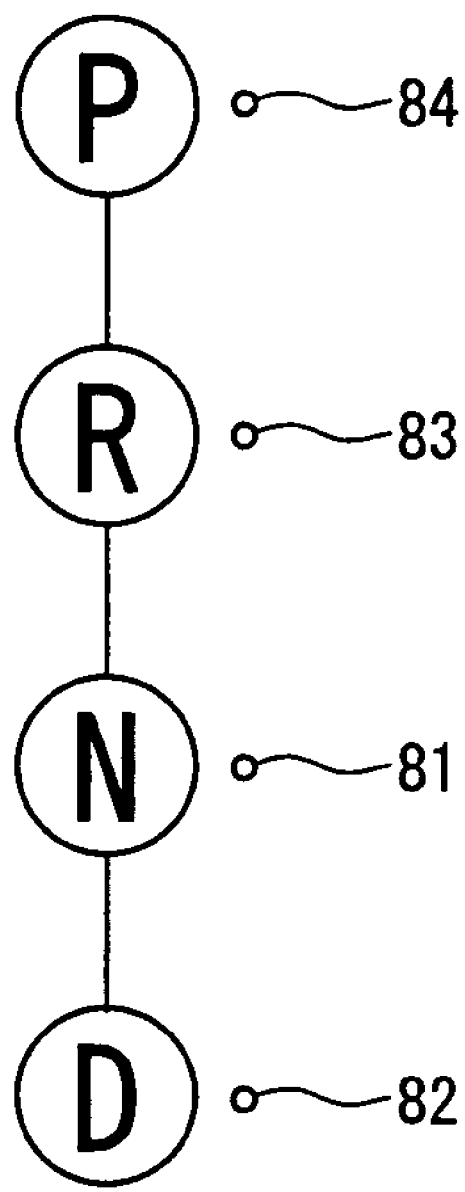
FIG. 2 is a diagram illustrating an operation pattern of a change lever constituting the parking device for vehicles, constituted according to the present invention.

Next, described below is a case where the change lever 77 has an operation pattern as shown in FIG. 2.

In the operation pattern of the change lever 77 shown in FIG. 2, the drive position (D), neutral position (N), reverse position (R) and parking position (P) are arranged in straight-line. At the drive position (D), neutral position (N), reverse position (R) and parking position (P), there are respectively arranged the drive position detection means 82, neutral position detection means 81, reverse position detection means 83 and parking position detection means 84, like in the embodiment illustrated above with reference to FIG. 1. In the case where the reverse position (R) exists between the neutral position (N) and the parking position (P) as described above, the change lever 77 passes through the reverse position (R) when it is operated to the parking position (P) after the change lever 77 has been operated to the neutral position (N) in bringing the vehicle into a halt. The reverse position detection means 83 is turned-on when the change lever 77 passes over the reverse position (R). In response to the above turn-on signal that is produced, the control means 10 sends control signals to the select actuator 51 and the shift actuator 52 constituting the speed-change actuator 5 to bring the transmission 3 into engagement with the reverse gear. Accordingly, the transmission 3 is brought into engagement with the reverse gear and maintains this state. And, when the change lever 77 is positioned to the parking position (P), the teeth 711 formed at the lower end of the engaging member 71 is brought into engagement with the parking gear 6 to lock the input shaft 31, as described above.

When the change lever 77 has not been operated to the parking position (P) even after the vehicle is halted and the engine key is turned off, the power source for the parking device needs to be turned off after being delayed by a predetermined period of time. And, the power source for the parking device is turned off after the change lever 77 is operated to the parking position (P) within a predetermined period of time and after the transmission 3 is brought into engagement with a predetermined gear by the select actuator 51 and the shift actuator 52 that constitute the speed-change actuator 5. When the change lever 77 is not operated to the parking position (P) within the predetermined period of time, it is recommended to produce an alarm by energizing a buzzer or the like.

According to the parking device of the present invention constituted as described above, provision is made of a parking operation detection means onto the operation passage of the change lever from the neutral position to the parking position, and when the operation of the change lever is detected by the parking operation detection means, the speed-change actuator is operated to bring the transmission into engagement with a predetermined gear. Therefore, the parking gear provided onto the input shaft can be brought into engagement with the parking lock mechanism in a state where the transmission is engaged with the predetermined gear.

The invention claimed is:

1. A parking device for vehicles in which the rotation of an input shaft of a transmission is not limited by the frictional force of an engine when the engine is brought into a halt, said parking device comprising:

a parking gear provided on said input shaft, a parking lock mechanism which selectively engages with said parking gear, a change lever which instructs a gear position of said transmission and is mechanically coupled to said parking lock mechanism, and a speed-change actuator for shifting said transmission to each gear position;

and further comprising:

a neutral position detection means arranged at a neutral position of said change lever, a parking operation detection means arranged in an operation passage of said change lever from said neutral position to a parking position, and a control means for operating said speed-change actuator based on detection signals from said neutral position detection means and said parking operation detection means;

wherein, after said neutral position of said change lever has been confirmed based on the detection signal from said neutral position detection means, when the operation of said change lever is confirmed based on the detection signal from said parking operation detection means, said control means operates said speed-change actuator to bring said transmission into engagement with a predetermined gear.

2. A parking device for vehicles according to claim 1, wherein it further comprises a limiting means for limiting the engagement of said parking lock mechanism with said parking gear, and said control means operates the limiting means until said transmission is brought into engagement with a predetermined gear when the operation of said change lever has been confirmed based on the detection signal from said parking operation detection means.

* * * * *